Patented Feb. 26, 1946

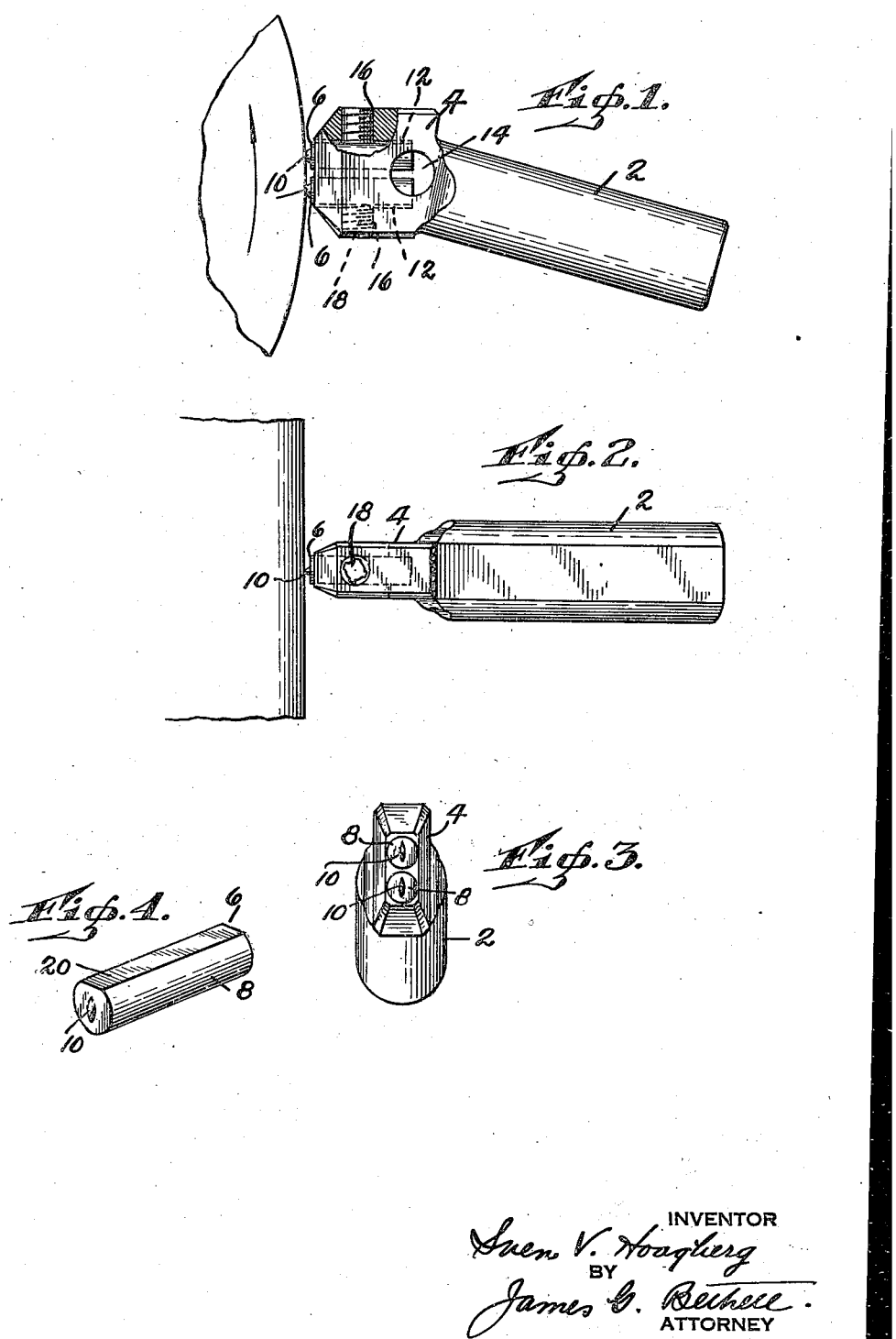

2,395,662

UNITED STATES PATENT OFFICE 2,395,662

DIAMOND TOOL

Sven V. Hoagberg, West Hartford, Conn., assignor to J. K. Smit & Sons, Inc., New York, N. Y., a corporation of New York Application June 6, 1944, Serial No. 539,014

1 Claim. (Cl. 125—39)

My invention relates to diamond dressing tools, and has for one of its objects to provide such a tool which is of new and novel construction.

More specifically my invention relates to an improvement in tools for dressing grinding wheels wherein I provide a tool having a plurality of diamonds set in a row in the face thereof, the construction being such that the diamonds are individually and readily replaceable, so that if one of the diamonds becomes dull in advance of the others, or is no longer usable for any reason, it is unnecessary to replace the entire tool.

I am aware that prior to my invention diamond dressing tools have been offered to the trade in which a plurality of diamonds are embedded in the face of the tool, either in clusters or in a single row, but in such tools if a diamond is dislodged or becomes dulled, then it becomes necessary of course to replace the entire tool.

With diamond dressing tools of the type wherein the diamonds are placed in one row across the face of the tool, it is essential that diamonds of proper shape and dimensions be selected and placed in the tool exactly in the right position, the tool being held against the wheel to be dressed with the diamond row in a plane perpendicular to the axis of the wheel. The stones have to be of equal and predetermined thickness, depending upon the type of dressing for which the tool is going to be used. The diamonds must be placed with the long axis of the protruding part of each diamond exactly in the above mentioned plane so that all the diamonds may work together, and so that the work is not required to be done by only one of the diamonds. It is essential also for the best results that the spacing of the diamonds be uniform. It will be appreciated therefore that the care and skill which must be exercised in the manufacture of such tools are considerable.

The construction of my improved dressing tool is such that the care and skill necessary to its manufacture are materially reduced as compared with the prior tools above referred to, while the stones being individually removable it becomes unnecessary to replace the entire tool when a stone becomes dulled, or should a stone become dislodged.

I have found also that my improved tool has another important advantage over prior tools constructed as above outlined, in that my tool has less inclination to become packed with chips and grit between the diamonds so as to be freer cutting; my construction also providing for a very much freer movement of cooling and lubricating fluid past the diamonds so as to overcome tendency to overheat.

Broadly speaking my invention provides a tool comprising a head and a shank, a plurality of diamonds being individually and removably mounted in the tool head. The number of diamonds composing a tool may vary, as will be pointed out hereinafter, but in all events each diamond is mounted in its own individual matrix and may be mounted in or removed from the tool head at will and independently of the other diamonds.

In the accompanying drawing wherein I have shown an embodiment of my invention:

Fig. 1 is a side elevational view of my improved tool;

Fig. 2 is a view similar to Fig. 1 turned through 90°;

Fig. 3 is an end view of the tool; and

Fig. 4 shows in perspective one of the diamond nibs or mounts.

Referring to the drawing in detail: 2 designates the shank and 4 the head of the tool. The shank and head are shown as integral and may be of steel, for example. For descriptive purposes I have shown a tool in which the head and shank are in alignment with each other. It will be appreciated that it is within the contemplation of my invention to provide a construction wherein the head 4 is offset, either right or left, with respect to the shank 2.

6 designates diamond nibs which are individually and independently mounted in the tool head. Each of these nibs comprises a metal matrix 8 having a diamond 10 embedded in the end thereof. The nibs 6 are preferably made by placing the diamond in a mold and then powdered metal upon the diamond, after which the assembly is subjected to sintering temperature while under pressure. It is to be understood, however, that the particular method employed in manufacturing the nibs forms no part of the present invention, with the understanding that a diamond 10 shall be firmly embedded in the end of each nib.

The head 4 of my improved diamond tool is provided with longitudinal bores 12 for the reception of the nibs 6, a bore being provided for each nib. The tool is provided also with a transversely extending hole 14 adjacent the bottom of the bores just referred to.

The head 4 is also provided with two holes 16, which are transverse to the nib-receiving bores. These holes 16 break through one wall of the nib-receiving bores 12 and are provided for the reception of set screws 18. These screws are preferably flat across their inner ends and are adapted to cooperate with a "flat" 20 provided on the side of each nib 6, so as not only to hold the nibs against longitudinal movement in the tool head, but to position the nibs properly in the head relatively to each other. As will be seen from Figs. 3 and 4, for example, the diamonds 10 are approximately the same width and are set so that their long axis is approximately at right angles to the flat 20. In this way the diamonds are properly positioned relatively to each other so that while dressing each diamond will do approximately the same amount of work.

It will be understood that the nibs are all of the same length overall, and so are the bores 12. No skill is required therefore in setting the nibs in the tool head. After the proper nibs have been selected it is merely necessary to bottom them in the bores 12 and to set up the screws 18. It has been explained that the "flat" on each nib is formed at right angles to the long axis of the diamond, and inasmuch as the screws 18 are flat ended, I am assured that when the screws are set up it is not possible to twist the nibs so as to throw the diamonds out of proper alignment with each other.

It will be appreciated that when it is desired to replace a nib it is merely necessary to insert a tool of some sort into the hole 14 beneath the nib to force it out whereupon the nib may be removed with the fingers.

It will be appreciated that my improved tool possesses decided advantages over prior tools for similar work. As repeatedly pointed out above, a worn or broken diamond can be readily replaced and it is no longer necessary to replace the whole tool. Then again, a diamond which has worn so that it may not be suitable for one type of dressing may be matched up with another worn stone and the two worn stones used for another type of dressing where sharp stones may not be essential. It will be seen also that because the diamonds are set in individual nibs, and because the matrix 8 of each nib projects slightly beyond the face of the head 4 of the tool, I obtain an increase in available clearance space between the diamonds, thereby reducing to a major extent clogging of this space, glazing of a wheel being dressed and facilitating the circulation of water or other coolant in and around the diamonds.

It is to be understood that changes may be made in details of construction without departing from the spirit and scope of my invention.

What I claim is:

A diamond tool for dressing grinding wheels, said tool comprising a shank and a solid head, the latter being provided with a flat face the plane of which is transverse of the longitudinal axis of the tool, a plurality of diamond-carrying powdered metal nibs mounted for individual removal in spaced relation in the said flat face of the head, the nibs being arranged in a straight line which extends transversely of the longitudinal axis of the tool, each nib having a flat extending lengthwise of the same, the position of the diamonds relatively to said flats being the same throughout, said head being provided with a plurality of parallel bores for the reception of said nibs, and with a plurality of transverse bores for the reception of screws adapted to cooperate with the flat of each nib, to align the diamonds properly with each other when the said screws are turned into engagement with said flats.

SVEN V. HOAGBERG.